Oct. 14, 1930.  L. DE FLOREZ  1,778,450
FLOW STABILIZER
Filed Dec. 20, 1926
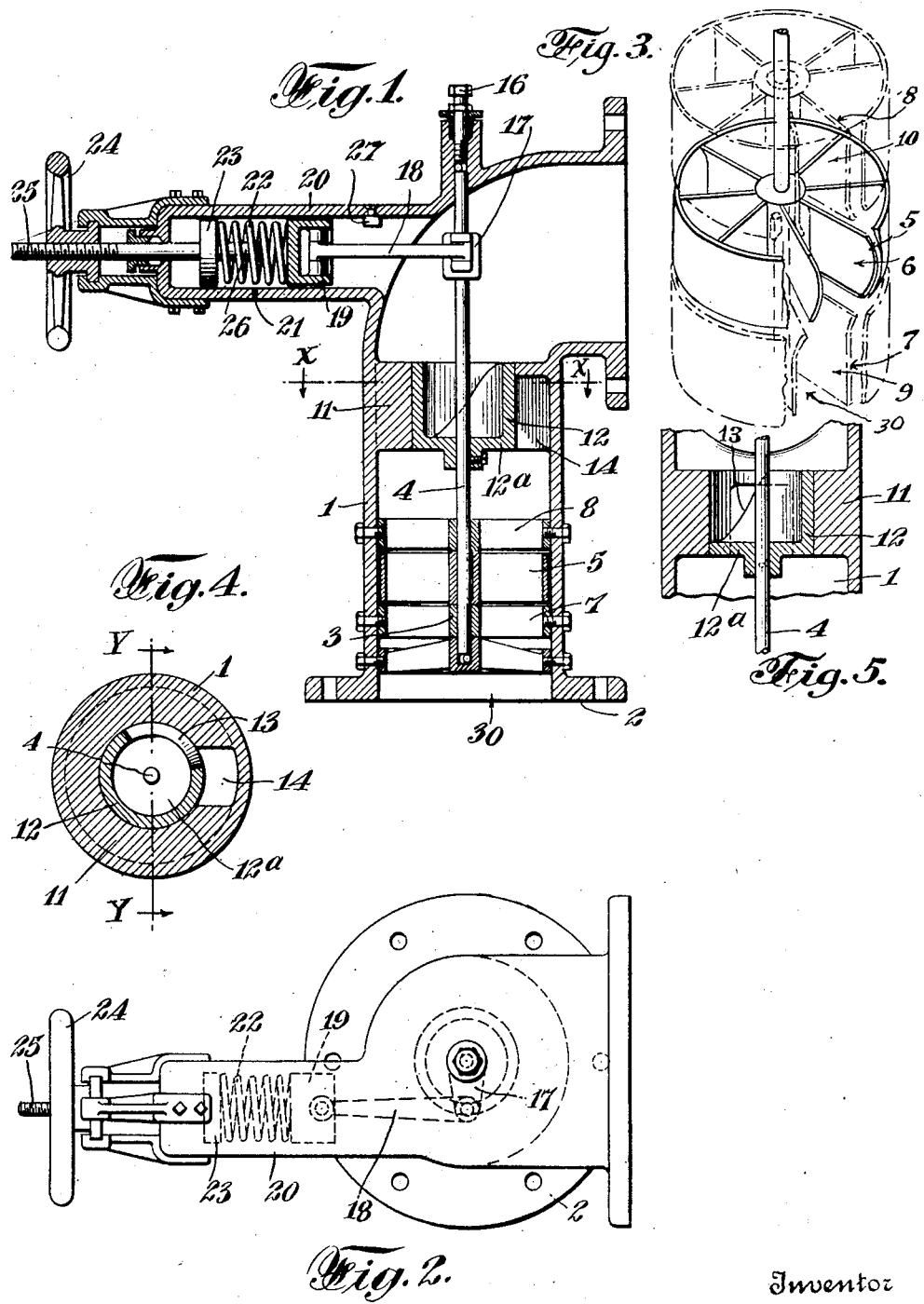
Inventor
Louis DeFlorez
By his Attorney
Ramsay Hogue Patented Oct. 14, 1930

1,778,450

UNITED STATES PATENT OFFICE

LUIS DE FLOREZ, OF POMFRET, CONNECTICUT

FLOW STABILIZER

Application filed December 20, 1926. Serial No. 155,905.

My invention relates to a method and apparatus for stabilizing the flow of fluids to obtain and maintain a desired predetermined rate of flow.

The invention may be used in connection with any fluid both liquid and gaseous but it is particularly adapted for use in a system handling liquids such as oil for example, the characteristics of which are subject to rapid and substantial change.

The maintenance of a constant flow in a hydraulic system with a fluid such as oil is a difficult problem due to the variable factors of specific gravity, viscosity, pressures and temperatures, change in any of which may occur rapidly. It is the aim of my invention to provide an apparatus which will be actuated by the velocity and weight of the fluid passing through it so that the flow will be corrected by the action of the apparatus with respect to these two factors and will not be materially influenced by changes of other conditions within the system.

Heretofore the control of fluid has been effected by utilizing the pressure differential in conjunction with an orifice or by the maintenance of constant pressure conditions. These methods, however, are not accurate where the fluid to be regulated is subject to changes in character and where variations of temperature and pressure may occur rapidly within the system.

In my apparatus the impact and reaction of the flow is directed against a rotative element the rotation of which is resisted by a force which can be adjusted at will and the motion of the rotative element against this force actuates a means for varying the free area of passage to control the flow. The force applied by the flow is a function of the velocity and the unit weight of the fluid and it will be evident that the corrections which are made by the motion of the rotative element against a predetermined force will tend to compensate for variations in either of these factors so that the quantity of fluid passing through the apparatus will tend to remain constant for a given setting of the adjustable force.

My invention comprises a stationary set of guides or vanes which direct the fluid flow against a rotative set of guides or vanes, causing a turning moment as a result of impact and reaction. Upon leaving this rotative member the flow encounters a second set of stationary vanes or guides which forces the flow to assume a definite direction. The effect of this arrangement is to provide a maximum impact with a definite reaction of the fluid upon leaving the movable vanes. The movable set of vanes is connected to a member which constitutes the movable member of a variable orifice or valve which is actuated in such a manner that the area of passage varies inversely with the impact of the flow, the variation being caused by the change in torque in the movable member due to the momentary variation in the velocity or specific gravity of the fluid. The motion of the vane is resisted by an adjustable opposing load applied by a spring or other equivalent means to effect the desired rate of flow. A damping means is also provided to overcome the tendency of the movable parts to oscillate thus preventing hunting. My invention has the further advantage that the movable parts may be contained entirely within a casing, without recourse to stuffing boxes, which might cause inaccuracies due to friction.

My invention will best be understood if the following description is read in connection with the accompanying drawings, in which like numerals refer to like parts:

Figure 1 is a general sectional view of the apparatus;

Figure 2 is a sectional view of the dash pot and loading mechanism;

Figure 3 is an enlarged perspective view of the vane system showing the details of construction and operation of the motor and stator units;

Figure 4 is a cross section on line X—X of Figure 1 showing the apertured valve member and a fluid passageway communicating therewith.

Figure 5 is a detailed view along the line Y—Y of Figure 4 showing a side view of the valve member.

It will be seen that my improved apparatus comprises a casing 1, forming a part of the fluid conduit through which the fluid to be regulated passes. This casing may be provided with suitable flanges 2, or other means for connecting it with the conduit system. The conduit is provided interiorly with journals, 3, which carry a shaft, 4, upon which is fixedly mounted the rotative vane element 5 and the rotative valve member 12. The rotative vane element 5 is keyed to or otherwise securely fixed to the shaft 4, and comprises a plurality of curved vanes radially arranged with respect to the shaft 4 and forming passageways 6 therebetween. Fixedly mounted within the casing and on either side of the rotative vane element are the stationary vane elements 7 and 8, each comprising a plurality of vanes radially arranged with respect to the shaft 4 and forming passageways 9 and 10 therebetween, adapted respectively to direct the flow against and lead it away from the rotative member. Figure 3 shows in perspective the radial arrangement of the vane elements 5, 7 and 8 and illustrates the course of the fluid flow therethrough. It will be observed that the vanes of the rotative member are curved so that the passageways 6 are inclined with respect to the upper and lower faces of the member 5. The stationary vanes are curved at their tips so as to continue the line of the rotative vanes. The result of this arrangement is to provide a maximum impact of the flow against the rotative vane member and to direct the flow to and away from this member in straight lines.

Beyond the stationary vane 8 the interior of the casing is partially closed by the shoulder, 11, extending inwardly from the wall of the casing. In the constricted passageway thus formed, and making a close fit therewith, is positioned the rotatable valve member 12. This member is also fixedly secured to the shaft 4, and its movement will therefore be determined by the movement of the rotative vane 5. The valve member 12, which may be cylindrical in shape, is closed at its rear end 12ᵃ, but open at its front end, and is provided with an orifice, 13, in its side leading into its hollow interior. Extending partially through the shoulder 11 and along the side of the valve member 12 is a passageway 14, which is adapted to communicate with the orifice 13 when the valve member 12 is in proper position therefor.

It will thus be seen that the fluid, upon leaving the stationary vane 8, will be directed through the orifice 13 in the valve member 12, and that the flow, which is maximum when the valve member is in such position that the orifice 13 is directly opposed to the passageway 14, will be gradually decreased as the area of the orifice in communication with the passageway is reduced by the rotation of the valve member. The vane element and the valve member are so positioned respectively that the open area of the orifice 13 will be inversely proportional to the distance through which the vane element moves.

In practice it is desirable to make the fit between the stator and the rotor vane elements and between the valve 12 and the shoulder 11 reasonably close, and I therefore prefer to make the setting of the rotor upon the stator elements a ground fit. Such accuracy, however, is not essential in all cases. If desired, the adjusting screw 16 may extend through the whole of the casing to adjust the longitudinal position of the shaft 4 and to compensate for any wear.

Fixedly mounted on the shaft 4 is a crank 17, or other suitable means, for translating the rotating motion of the shaft into a reciprocating motion. This crank is connected by link 18 to a piston, 19, located in the cylinder 20. The piston is provided with an opening, 21, to permit the escape of fluid therethrough and thus constitutes a dashpot against which the rotation of the shaft operates. The piston also works against a spring, 22, bearing against a movable abutment, 23, the position of which may be regulated by adjusting the wheel 24 controlling the movement of the rod 25 on which the abutment 23 is mounted. It will be evident that this mechanism provides a means for preventing hunting of the rotor vane element, and that by proper adjustment of the wheel 24 any desired loading may be put upon this element.

Any suitable stops for limiting the movement of the spring 22 may be provided, and for this purpose I have shown the stops 26 and 27, positioned on opposite sides of the piston 20, stop 26 being an extension of the shaft 25. It will be understood that although the variation of the tension of the spring 22 is not a straight line function, it may for all practical purposes be considered to be so, as it will operate over only a very restricted distance, and if desired the length of the spring may be increased very considerably.

If desired the apparatus may be made reversible by attaching the spring 22 to the dashpot or piston 20 and also to the abutment 23, so that the spring may operate either in compression or in tension.

It will be evident that a flow through the apparatus in the direction of the arrow 30 will by its impact against the rotative vane member 5 provide a turning moment tending to rotate the vane member, which motion will be translated to the shaft 4 and the valve member 12. The orifice in the valve member 12 is so proportioned with relation to the rotative vane member that equal increments of rotor movement will give substantially equal increments of regulation of the flow. As the shaft 4 is rotated the piston 20 will move against the compression of the spring 22, so that by setting the wheel 24 the impact required to turn the rotor 5 may be adjusted according to the flow desired. Thus for any single setting of the wheel 24 my apparatus will produce a substantially stable flow in a system where temperature and pressure conditions are variable and there will be no tendency of the moving parts to oscillate or to hunt.

While I have shown one form of my invention, it obviously may be modified to a considerable degree without departing from the spirit of the invention, and I therefore do not wish to confine myself to the particular modification shown and described.

I claim:

1. A flow stabilizing apparatus comprising a valve and means for regulating the opening thereof, including stationary and movable reaction members affected by the flow to be regulated, the inlet and exit portions of said stationary members being in substantially parallel relation.

2. A flow stabilizing apparatus comprising stationary means for directing the flow of a fluid, the inlet and exit portions of the stationary means being in substantially parallel relation, flow regulating means, and means movable relatively thereto and responsive to the flow to be regulated for actuating the flow regulating means.

3. A flow stabilizing apparatus comprising an axial flow turbine having a pair of turbine elements, one stationary and one movable, said stationary elements being adapted to direct the flow in substantially parallel relation with the axis of the turbine, means for regulating the fluid flow, and means operated by the movable turbine element for affecting the regulating means.

4. An apparatus for stabilizing the flow of hydrocarbons comprising a rotative member, means for directing the flow against said rotative member, other means for directing the flow away from said rotative member, the inlet and exit portions of said directing means being in substantially parallel relation, an apertured member in operative relation with the rotative member, and means for limiting the rotation of the rotative member.

5. A flow stabilizing apparatus comprising an axial flow turbine having two series of stationary vanes and a series of rotative vanes interposed between the stationary vanes, the inlet and exit portions of said stationary vanes being in substantially parallel relation with the axis of said turbine, and a valve member for controlling the amount of flow operatively connected to said rotative vanes.

In testimony whereof, I have signed my name to this specification this 17th day of December, 1926.

LUIS DE FLOREZ.